July 7, 1925.
A. J. MACY
1,545,470
STEREOSCOPIC MOVING PICTURE CAMERA
Filed May 5, 1919  4 Sheets-Sheet 1
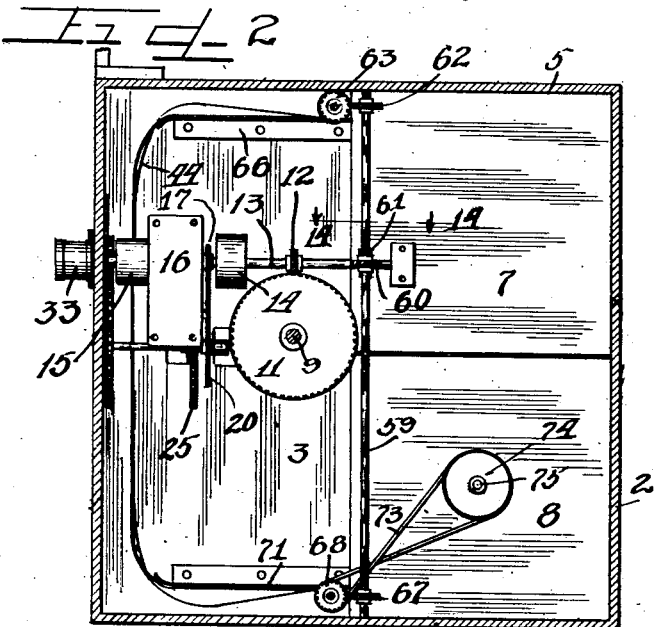
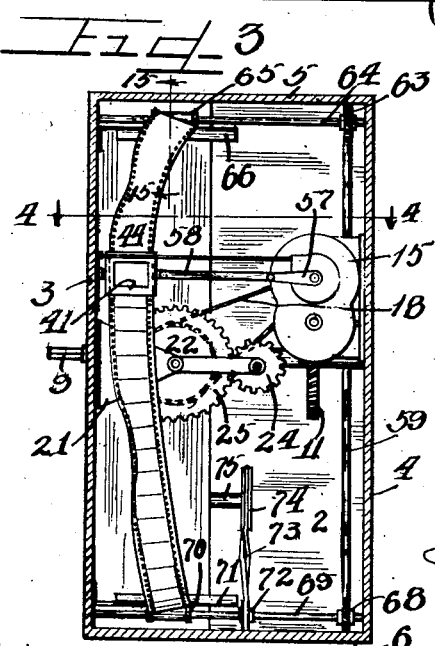
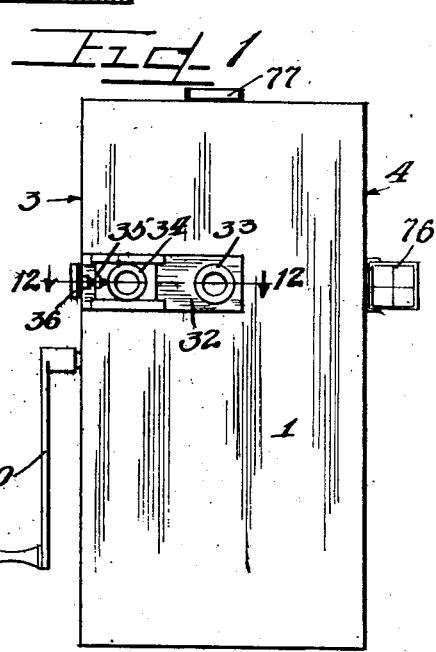

July 7, 1925.
A. J. MACY
1,545,470
STEREOSCOPIC MOVING PICTURE CAMERA
Filed May 5, 1919 4 Sheets-Sheet 2
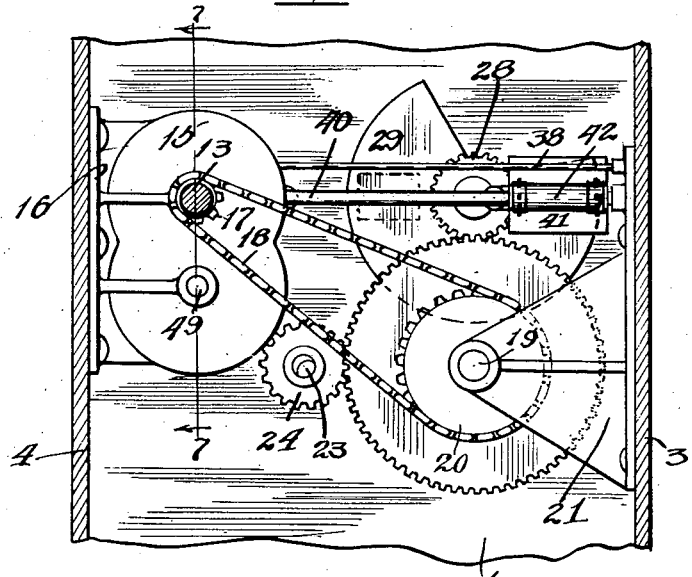
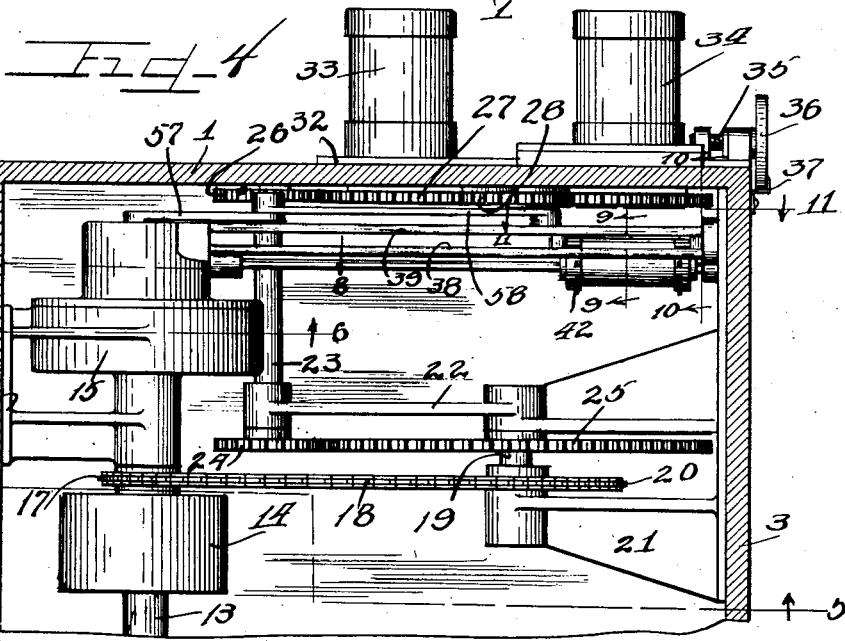

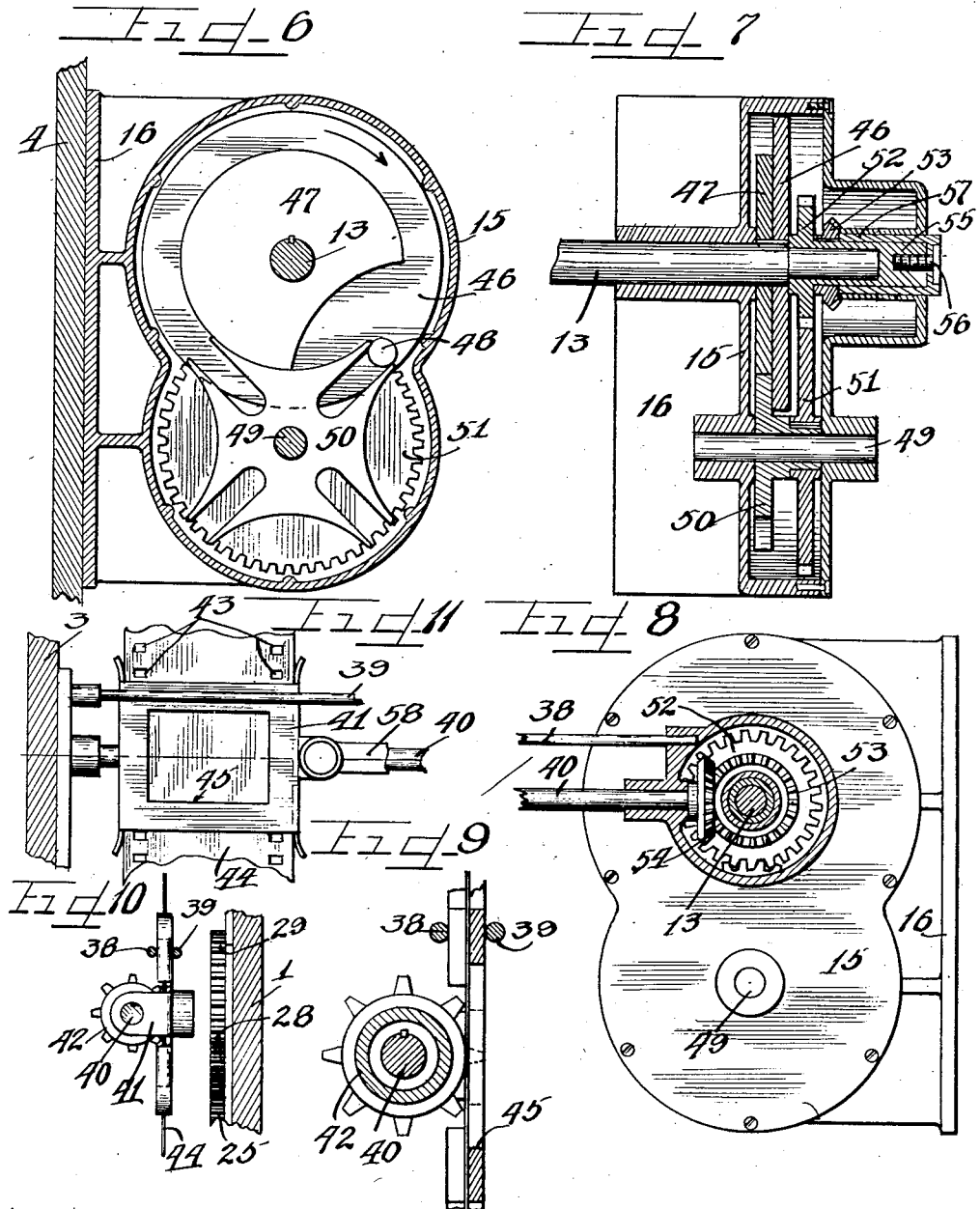

July 7, 1925.
A. J. MACY
1,545,470
STEREOSCOPIC MOVING PICTURE CAMERA
Filed May 5, 1919  4 Sheets-Sheet 4
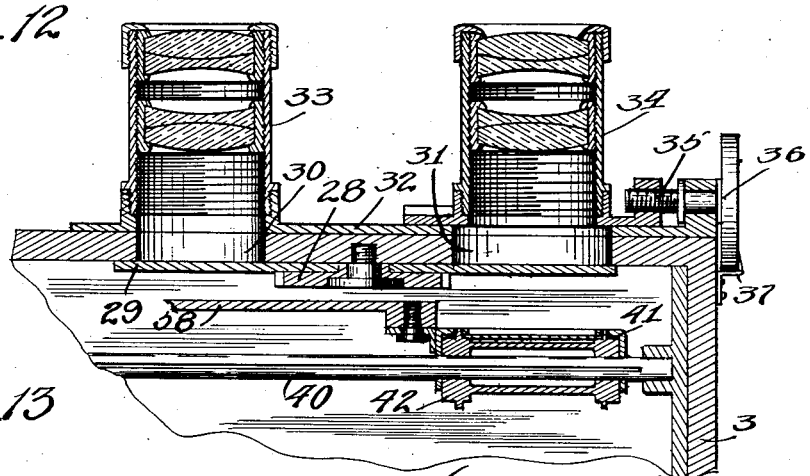
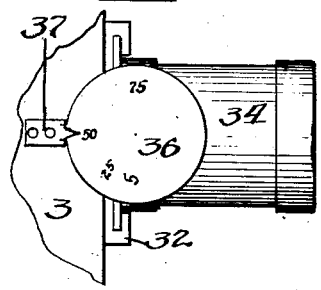
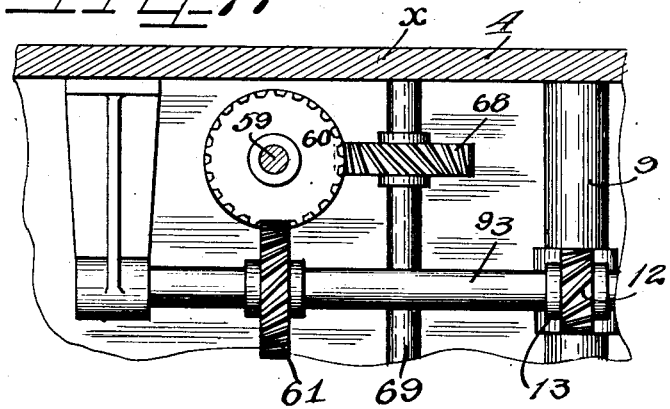
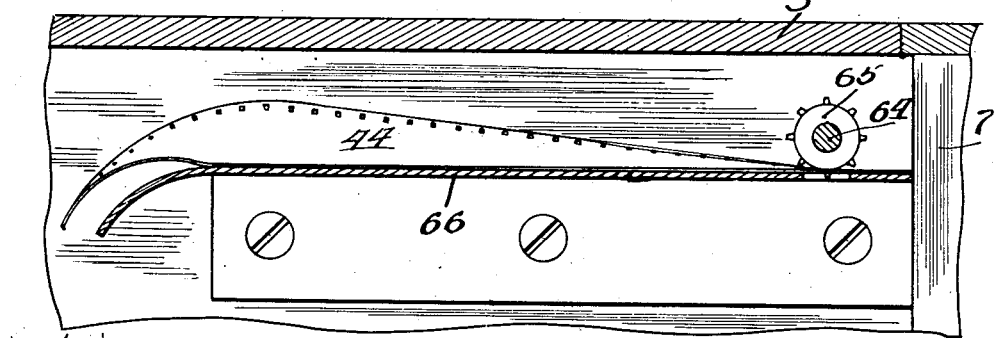
Witnesses
J. W. Angell
Charles Bell Jr.
Inventor
Alfred J. Macy
by Charles W. Hills
Atty.

Patented July 7, 1925.

1,545,470

UNITED STATES PATENT OFFICE.

ALFRED J. MACY, OF CHICAGO, ILLINOIS.

STEREOSCOPIC MOVING-PICTURE CAMERA.

Application filed May 5, 1919. Serial No. 294,787.

*To all whom it may concern:*

Be it known that I, ALFRED J. MACY, a citizen of the United States, and a resident of the city of Chicago, in the county of Cook and State of Illinois, have invented certain new and useful Improvements in a Stereoscopic Moving-Picture Camera; and I do hereby declare that the following is a full, clear, and exact description of the same, reference being had to the accompanying drawings, and to the numerals of reference marked thereon, which form a part of this specification.

Stereoscopic photography has always presented a fascinating picture method of portraying images but has never come into extensive use, owing to trouble incident to the preparation as well as the viewing of a stereoscopic picture. On the other hand, motion pictures have come into great popularity throughout the entire world, but since these heretofore have only been of the ordinary flat print type, a true representation of the image with the depth of field and seeming reality of the thing itself, is not obtained. I have found that it is possible to project a stereoscopic motion picture upon a screen but the difficulty is not so much in the projection of the picture as the preparation of the film. There are various methods known to me for projecting stereoscopic motion pictures on a screen. For instance the two complementary views of a stereoscopic picture may be thrown upon the screen simultaneously, the one in one color and the other in a complementary color, and then the spectator views the superposed colored pictures through colored spectacles, or color screens—the right eye screen shutting out the left eye color picture and the left eye screen shutting out the right eye color picture. Using the same color screens or spectacles it is also possible to obtain the same stereoscopic effect in an easier manner by projecting the right and left eye complementary views alternately in their respective colors on the screen, and the persistency of vision inherent in the human eye, will cause the spectator to see a complete and perfect stereoscopic picture besides all the interesting features of movement, of the objects in an ordinary motion picture.

By my invention I propose to make a motion picture camera wherein the right and left eye views of a stereoscopic picture are taken in alternate order on a continuous motion picture film. In order, however, to secure the most artistic effects, that is to bring prominently before the audience the object or person of greatest interest on whatever quarter of the picture it is desired to have such positioned for the best effect when the pictures are projected on the screen—it is advantageous to secure registration of the principal point of interest and approximate registration of the principal objects of the picture in the respective right and left eye views on the screen, necessitating the proper positioning of the principal object upon the film in both complemental views when the picture itself is made.

One of the difficulties encountered in properly making a series of right and left eye stereoscopic pictures one after another upon a film, has heretofore been the difficulty in properly "framing" each view at the time of impression, so as to impart the highly artistic effects desirable in projection. I avoid this objection by making the pupillary distance between the lenses of the stereoscopic motion picture camera adjustable so that for principal objects at different distances from the camera different adjustments of the lenses are made. This adjustment is very slight however, but sufficient to cause the respective images photographed upon the film to be properly positioned thereon, so that the desired degree of registration of the elected portions thereof takes place when the persistency of vision causes the same to be apparently superimposed upon the screen as they are projected in successive order.

In order to secure proper adjustment of the lenses the adjusting mechanism must be graduated according to determinations previously made and proper horizontal and vertical disposition of the principal object of the image upon the film is assured by the use of two finders, one preferably horizontally aligned with the lenses and the other vertically aligned with either one or centralized with respect to both. This adjustment feature of the lenses permits the object of greatest interest to be placed in the most desirable portion of the picture and then correctly registered when the respective complementary views are taken.

This camera is also possessed of two very important features of use and operation due to the fact that the two lenses are adjustable toward and away from one another.

If the adjustment of the lenses is made either over or under an amount than that required for impressing the stereoscopic scene upon the film in its natural and true relation, other interesting effects are gained. Consequently the question of registration is comparative, that is, over registration is a greater registration of certain objects than the registration of the same objects that exists when the scene is viewed stereoscopically, and appears in its natural state or relation. This feature probably can be more clearly explained by an example. In viewing an ordinary two-image stereoscopic picture through a stereoscope, any specks or scratches upon the surface of the picture will appear to lie in the plane which is between the observer and the stereoscopic scene and all objects of the stereoscopic scene, even though in the extreme foreground, are back of this imaginary or reference plane which coincides with the plane of the picture. By securing an over registration, that is, by causing the right eye complemental view of the stereoscopic picture to appear slightly to the left eye complemental view to appear slightly to the right of the normal position of registration with the right eye view, a startling and mystical effect is gained which causes those objects of the respective complemental views which have been over registered in the manner described, to apparently assume a position forward of the reference plane of the picture and in a position in space between the eyes of the observer and the surface of impression on which the picture is actually shown or portrayed.

Owing to the fact that the complemental views of a stereoscopic picture are not exactly alike, it is not possible to superpose the pictures so that every object on one will coincide with the other. Consequently the question of registration is comparative, that is, over registration intends an over registration of those objects which is greater than or in a direction (toward over registration) from that registration existing when the scene is view stereoscopically and appears in its natural state or relation.

On the other hand an apparent under registration of the respective complemental right and left eye views when projected in successive order upon an impression surface, causes the objects which are under registered to apparently recede from the reference plane, that is, to retreat further into the stereoscopic scene and away from the observer, owing to the converse effect of over registration as explained.

It is an object therefore, of this invention to construct a stereoscopic motion picture camera wherein a left-eye portion of a stereoscopic picture is taken first through one lens of the machine, and then a right-eye portion of the picture through another lens and with mechanism within the camera for shifting the film first into the position behind the left-eye lens then advancing and shifting the film into position behind the right-eye lens so that the left and right eye complements of the stereoscopic pictures are photographed in successive order upon the motion picture film.

It is also an object of this invention to construct a motion picture machine adapted to make stereoscopic pictures in successive order upon a motion picture film for ready display thereof through a single lens projector and with means for shifting the film alternately into proper registration behind each one of a pair of lenses, one or both adjustable, to receive the exposures thereon.

It is also an object of this invention to construct a motion picture stereoscopic camera wherein a lateral shifting movement is transmitted to the film coincident with the advance thereof, to transfer the film from a position rearwardly of one lens into position rearwardly of the other so that with the opening of either of the lenses by the shutter, the film is in position to receive the proper impression of the left or right eye complement of the picture as the case may be.

It is furthermore an important object of this invention to construct a motion picture stereoscopic camera provided with vertical and horizontal alignment finders and one wherein right and left hand views of the double lens camera are impressed alternately upon a continuous film which during the closed period of the respective lenses of the camera, is advanced and transferred from a position rearwardly of one lens into position rearwardly of the other, and with a mechanism for adjusting the distance between the respective lenses of the camera to bring the principal object of the images into a proper degree of register upon the film in each of its "framed" positions behind said lenses.

It is furthermore an object of this invention to provide a stereoscopic, motion picture camera that is adapted to register its series of impressions, directly from its lenses upon a film, avoiding the bad effects of distortion, refraction and absorption, that obtain when reflecting media is introduced in front of the lens or lenses or between the lens or lenses and the film; one that provides adjustments adapted to be operated by the artist educator or other operator enabling him to achieve startling effects and powerful suggestions and as well to bring into play particular emphasis on the feature point of the pictures; a camera that makes impressions on the film in proper order and sequence whereby cutting and fitting of the film to give proper relative positions to the complementary views of the stereoscopic pictures is unnecessary, and producing a film adapted for use in a single lens series projector machine.

It is also an object of this invention to provide a motion picture camera capable of making stereoscopic pictures wherein the lenses of the camera are adjustable relatively to one another and by adjustment, may serve to cause an under or over adjustment registration of desired objects on the screen when the respective complemental views of the picture are viewed stereoscopically as for instance by rapid projection in successive order upon an impression surface such as a reflecting screen.

It is finally an object of my invention to provide a unitary machine adapted by a single operation to record action by a series of separate impressions having a stereoscopic relation to one another for reproduction as stereoscopic motion pictures.

Other and further important objects of this invention will be apparent from the disclosure in the drawings and specification.

The invention (in a preferred form) is illustrated in the drawings and hereinafter more fully described.

On the drawings:

Figure 1 is a front elevation of the camera embodying the principles of my invention.

Figure 2 is a side interior view thereof with parts shown in section.

Figure 3 is a front interior view of the camera with the front wall and lenses removed and parts omitted.

Figure 4 is a sectional detail on line 4—4 of Figure 3, with parts omitted.

Figure 5 is a fragmentary section taken on line 5—5 of Figure 4, showing a part of the interior intermittent drive mechanism and shutter for the lenses.

Figure 6 is a sectional detail on line 6—6 of Figure 4.

Figure 7 is a sectional detail on line 7—7 of Figure 5.

Figure 8 is a detail section on line 8—8 of Figure 4.

Figure 9 is a detail section on line 9—9 of Figure 4.

Figure 10 is a fragmentary detail section on line 10—10 of Figure 4.

Figure 11 is a fragmentary detail section on line 11—11 of Figure 4.

Figure 12 is an enlarged detail section on line 12—12 of Figure 1.

Figure 13 is an end view of the adjusting dial of one of the camera lenses.

Figure 14 is a fragmentary enlarged detail section on line 14—14 of Figure 2.

Figure 15 is an enlarged section through the upper guide over which the film is led from the feed reel.

As shown on the drawings:

The camera comprises a casing having a front wall 1, a rear wall 2, side walls 3 and 4, and a top and bottom wall 5 and 6 respectively. The casing as is common in motion picture cameras is adapted to receive a feed reel magazine 7 and a receiving reel magazine 8, fitted thereinto and readily removable in a well known manner. Journalled transversely within said casing in bearings provided for the purpose is a main drive shaft 9, and a detachable crank 10 is secured on the end thereof exterior to the side wall 3 of the casing for manual operation. Mounted upon said main driving shaft 9 is a large helical gear 11, as shown in Figure 2, which meshes with a helical pinion 12 on a counter-shaft 13, journalled longitudinally within the camera casing. Mounted upon the counter-shaft 13, is a small fly wheel 14, and the end of said shaft projects into a combined bearing and housing 15, having an attaching plate 16, integral therewith, whereby the same is secured to the side wall 4 of the camera casing. Secured on said shaft 13, adjacent the fly wheel 14, is a sprocket wheel 17, around which a chain 18, is trained, and said chain is also trained about a sprocket wheel 20, secured upon a shaft 19, which is journalled in bearing members 21, attached to the side wall 3 of the camera casing.

Journalled on an extension 22 of one of said bearing members 21, is a shaft 23. Secured on one end thereof is a pinion 24, which meshes with a gear 25, secured upon the shaft 19, together with the sprocket wheel 20. Secured upon the opposite end of the shaft 23 is a pinion 26, which as shown in Figure 4, meshes with a gear 27, mounted upon a shaft in the front wall of the casing, and this in turn meshes with and serves to drive a pinion 28, also mounted upon an inwardly extending stud shaft on the front wall 1, of the casing. Attached to the pinion 28, intermediate the same and the front wall 1, of the casing, is a rotary shutter element 29, having a sector opening cut therefrom of substantially 120° although the particular extent of the opening is dependent upon the exposure desired and closed period necessary for the lateral shifting and feed movement of the film between exposures and may be more or less than the particular amount shown here according to the design of the camera. Said rotary shutter element 29, sweeps over both of two lens apertures 30 and 31 respectively in the front wall 1, of the casing, opening and closing the same alternately. Secured upon an attaching plate 32, which is apertured to register with the lens apertures 30 and 31, is a photographic lens element 33, and slidably mounted upon said plate 32, and in register with the larger aperture 31, of the front wall of the casing, is the other photographic lens element 34. These respective lens elements 33 and 34, may be of different but complementary colors if desired for use in making colored motion pictures in a manner hereinafter pointed out. A set screw 35, is journalled in a flange extension of the plate 32, and has threaded engagement with the flange extension of the lens element 34, whereby adjustment of said set screw by its knurled and graduated head 36, serves to slide the lens element 34, toward or away from the lens element 33. A fixed pointer 37 is secured upon the side wall 3 of the casing, and registers over the surface of the knurled head 36 of the adjusting screw to indicate the position of adjustment thereof. Preferably, said screw head is provided with indications denoting the distance of the principal object from the lenses thereof, whereby the lens element 34, may be adjusted for that purpose, so that the principal object or objects of the stereoscopic picture are brought substantially into register at a predetermined position on the film when the complementary views are made.

Mounted transversely within the camera casing and disposed horizontally therein, and directly back of the respective lens apertures 30 and 31, are a pair of guide rods 38 and 39, respectively. Journalled parallel thereto and slightly lower and to the rear thereof, is a grooved shaft 40. Slidable upon the shaft 40, and with its upper extension guided between the rods 38 and 39, is a film guide carriage or "frame" 41. Mounted in extending arms of said carriage is a roller sprocket element 42, the teeth of which are adapted to engage in the apertures 43, of a standard type of motion picture film 44, which passes through said frame in a manner shown in Figures 9, 10 and 11.

Said guide carriage or frame 41, for the film 44, is provided with an aperture 45, as clearly shown in Figure 11, and through this aperture, a portion of the film is exposed behind one of the lenses to receive an image photographed thereon when the shutter opens the lens aperture. An intermittent driving mechanism is provided for feeding the film through the carriage during the intervals that the lens apertures are closed by the shutter, and also for alternately sliding the film guide carriage or frame 41, from a position in register back of one lens into a position of register back of the other lens.

This mechanism comprises in part a disc 46, secured upon the shaft 13, within the housing or casing 15, as shown in Figures 6 and 7, and attached to said disc is a mutilated disc 47, from which a segment has been cut away as shown clearly in Figure 6. Said disc 46, also has a pin 48, projecting therefrom near the periphery for a purpose hereinafter pointed out.

Mounted in the casing 15, is a shaft 49, directly below and parallel to said shaft 13, and journalled thereon in co-acting relation with said disc 47, is a slotted Geneva gear member 50, and an attached gear 51. Freely rotatable upon the shaft 13, within the housing 15, is a pinion 52, meshing with the gear 51, and having associated therewith, a bevel pinion 53. Projecting into and journalled within the end of the housing 15, is the grooved shaft 40, of the film carriage, heretofore mentioned, and secured on the end of said shaft 40, is a bevel pinion 54, meshing with the bevel pinion 53. As clearly shown in Figure 7, the hub of the pinion 52, is extended as indicated by the reference numeral 55, and fitted thereover and secured thereto by the stud 56, is the hub end of a crank 57, which is journalled in a bearing formed in the end of the housing 15, thus in its assembled relation with the shaft 13, affording as well a bearing for said shaft. Pivoted to the end of the crank 57, is a link or connecting rod 58, with the other end thereof pivotally connected to the film frame 41, as shown in Figures 3, 4 and 11.

It is evident from Figure 6, the Geneva gear element 50, receives one-quarter revolution for each full revolution of the associated discs 46 and 47, and serves to drive the gear 51, likewise. The gear 51, having a 2 to 1 gear ratio with the pinion 52, serves to impart a half revolution to said pinion and bevel pinion 53, associated therewith, whereby the shaft 40, receives a one-half revolution between each intermission, and likewise the crank 57, swings through 180 degrees between each intermission of the drive, serving to shift the carriage from one extreme position back of one lens into the other extreme position back of the other lens.

Journalled vertically and at one side of the camera casing on the interior thereof, is a shaft 59, provided with a helical gear 60, which meshes with another helical gear 61, secured upon the fly wheel shaft 13, as shown in Figure 14, whereby said upright shaft receives a constant drive imparted thereto. Said shaft 59, has a helical gear 62, which meshes with the helical gear 63, secured upon a transversely extending shaft 64, journalled in the upper end of the camera casing and provided with the toothed feed roll 65, to engage with and feed the photographic film from the feed magazine 7. Positioned horizontally between the shaft 64, and its feed roll 65, is a wide flat film guide 66, the outer end of which is turned downwardly, as clearly shown in Figures 2 and 15, and said guide is attached by a flange extension to the side wall 3, of the camera casing.

Similarly at the lower end of the upright shaft 59, a helical gear 67, is secured thereon, meshing with the helical gear 68, journalled within the camera casing, and positioned beneath another film guide 71, the outer end of which is turned upwardly to receive the film easily therearound, and likewise said guide is attached to the side wall of the camera casing. A drive is also provided for the reel within the receiving magazine 8, and this comprises a small pulley 72, secured upon the lower transverse shaft 69, having a belt 73, trained therearound, and around a sheave 74, which is secured upon a shaft 75, engaging the reel (not shown), within the receiving magazine 8. The belt drive 73, for the reel within the receiving magazine of the camera, is such as to draw the film taut, but without injury from the mechanically driven receiving reel 70, and beyond a certain point of tautness, the belt 73, slips upon its sheave 72.

Attached upon side of the camera casing preferably upon the exterior of the side wall 4, is a conventional type of collapsible view finder 76, and the horizontal central axis of the finder is coincident with the horizontal axis of the respective lens elements. Similarly mounted conveniently upon the top wall of the casing is another collapsible view finder 77, the vertical central axis of which has the same relation to the film action or image viewed therein as the vertical central axis through the exposed portion of the film within the film frame back of either of said lens elements, preferably the fixed lens element 33.

The operation is as follows:

A new film to be used to make a photograph is placed into the camera casing within its magazine 7, and the end thereof, trained outwardly beneath the feed roll 65, over the guide 66, downwardly through the film carriage 41, then beneath the film guide 71, in the lower end of the camera casing, over the receiving drive roll 70, and into the receiving magazine 8, and there attached upon the reel, within said magazine (not shown) but which is standard in motion picture camera construction. The feed roll 65, and receiving roll 70, are continuously driven, and consequently a certain amount of slack film is permitted to be disposed therebetween to provide for the intermittent drive of the film by the toothed roll 42, as well as the shifting movement of the carriage 41, in which said toothed roll 42, is mounted.

The camera is now ready to photograph a series of stereoscopic pictures directly upon the film necessitating only a continuous operation of the crank by the operator. The final adjustment of the parts such as the focusing of the lenses, if not of universal focus, and more important in this particular machine, the adjustment of the pupillary distance between the respective lenses according to the principal objects of the image is done after a choice of objects or a particular action to be photographed, has been made. The respective upper and side view finders are used in this connection, the one mounted on the upper end of the machine for centralizing the principal objects of the image upon a vertical axis upon any particular portion of the film exposed for the photograph, and the other being used to similarly centralize the action upon a horizontal axis of a particular portion of the film exposed. Thus the principal object of the action may be brought to the center of the film is so desired, or to any quarter thereof. Knowing the distance of the principal object of the film action from the lenses, the graduated knurled adjusting screw head 36, is adjusted to correspond to this distance, thereby shifting the lens element 34, either toward or away from the lens element 33, so that the principal object of the film action in the two photographs made upon the film by the respective lens elements, will be aligned for apparent registration when displayed and if not exactly, nearly so, so that the desired effect is realized. This is an important feature and a greater correction is necessary when the principal object of the film action is near to the lenses. A ready demonstration of the effect upon the screen if this correction is not applied may be readily demonstrated by focusing the eyes upon a far object and holding up a finger of the hand in the foreground, then rapidly opening and closing the eyes alternately. When this is done, the object nearby will appear to shift from one position to another, relative to other objects focused upon, a greater distance for nearby objects, and an nearly unappreciable amount for faraway objects. The adjustability feature of the lenses may be compared to the action of the human eyes in drawing the lines of sight from each eye to a point of convergence on the principal object of a scene. Of course, the axes of the lenses are parallel but the lenses could be mounted to move on pivots or about centers so as to make the axes converge at any desired point. This is not necessary however to obtain the result desired and substantially the same results are obtained in the desired degree of registration of the principal object by the linear adjustment of the lenses as shown.

The adjustable feature of the lenses is used also for another purpose when desired to produce magical and mystifying effects when the pictures are viewed stereoscopically. This consists in so adjusting the lens elements that certain objects of the stereoscopic scene are either over or under registered from normal when the pictures are viewed stereoscopically.

When the crank 10 is rotated a continuous drive is imparted to the shaft 13, from the large helical gear 11, on the crank shaft 9, and the fly-wheel 14, on said shaft 13, tends to maintain a uniform rate of drive to the mechanism operated thereby. The constantly driven feed roll 55, and receiving roll 70, serve to move the film 44, through the camera, and the toothed roll 42, of the film carriage 41, serves to impart an intermittent movement to the film through said carriage. The carriage is always in an "arrested" position back of one of the lens elements to receive a picture impression upon the film when the cutaway portion of the shutter element 29, registers with the particular lens behind which the film is situated at that instant. One portion of the intermittent drive mechanism is so timed that the shaft 40, on which the toothed roll 42, of the film carriage is mounted, receives its drive of one-half a revolution at the time that the carriage 41, is shifted either to the right or left by the crank 57, and connecting rod 58, said crank likewise making a one-half revolution or swinging through 180 degrees. The one-half revolution of the shaft 40, and roll 42, serves to feed the film through said carriage, a distance equal to one picture space upon the film. Thus a series of images are photographed upon the film, first a left- and then a right-eye view of the film action, and since the lenses have been properly adjusted, the principal object of the film action is properly "framed" on the film even though the two views comprising the stereoscopic image are taken from different points.

Of course in the camera as actually constructed the various moving parts are all balanced so that vibration of the machine is obviated. For the sake of clearness however, I have omitted illustration of the camera thus constructed as my invention clearly proposes to cover all embodiments and forms wherein the results achieved as pointed out are obtained.

Be it understood, I purpose claiming broadly the idea of a self-contained machine for making stereoscopic motion pictures by shifting a film within the camera in the same plane.

Another employment of the adjustable means on the lenses is to the end that registration of a point may be carried past a degree of actual registration and the point brought to apparent projection into the actual atmosphere when the picture is reproduced and viewed stereoscopically. The degree of over registration determines the degree of projection of the object into the actual atmosphere, that is the apparent displacement of the object outwardly upon the actual plane of the picture. Under registration on the other hand tends to make the point or points recede back of the plane of the picture, an amount greater than really existing in the actual scene photographed. These effects are desirable in producing magical effects upon the screen when pictures so made are projected.

I am aware that various details of construction may be varied through a wide range without departing from the principles of this invention, and I therefore do not purpose limiting the patent granted otherwise than necessitated by the prior art.

I claim as my invention:

1. A stereoscopic motion picture camera comprising mechanical means for feeding a strip of film therethrough, a pair of lense elements, each adapted to receive an image therethrough from a different point depending upon the separation of said lens elements, and mechanisms for shifting the film laterally within said camera alternately into a position of focus back of each of said lens elements to receive the respective images photographed in successive order one after the other on said film.

2. A motion picture stereoscopic camera comprising a pair of horizontally aligned lenses, mechanisms for shifting a strip of film in a lateral plane perpendicular to the axis of the lenses, means for advancing the film vertically as it is shifted laterally, and a rotating shutter element in synchronism with the film shifting mechanism for alternately admitting light through the lenses to the film.

3. A stereoscopic motion picture camera adapted to receive a continuous film moved therethrough, a pair of lenses adjustably related to bring the principal objects of the image from each lens substantially at the same position of alignment on the respective portions of the film exposed therefor, and means for shifting the film in the same plane within the camera into different positions to receive images from each of said lenses photographed thereon in successive order.

4. A stereoscopic motion picture camera comprising a casing, a pair of spaced lenses therein, a track mounted in the casing in rear of the lenses, a frame slidable on the track, a strip of film adapted to be advanced vertically through the frame, and means for moving the frame alternately into positions in rear of the lenses.

5. A stereoscopic motion picture camera comprising a casing, a pair of spaced lenses therein, a track mounted in the casing in rear of the lenses, a frame slidable upon the track, a strip of film adapted to be moved through the frame, means for moving the frame alternately into positions in rear of the lenses, and a rotating shutter timed with the frame to admit light through the lens to the film in the frame.

6. A stereoscopic camera comprising a pair of lenses horizontally alined, means for shifting a film strip linearly in a lateral direction alternately in rear of said lenses, and mechanism for photographing the images projected through said lenses alternately in vertical order upon said film strip.

7. A stereoscopic motion picture camera comprising horizontally aligned lenses, means varying the separation of said lenses one from another, and means moving a photographic element linearly in a lateral direction to receive the respective complementary images of a stereoscopic picture projected through said respective lenses upon the photographic element, and means moving the photographic element vertically in rear of the lenses.

8. A stereoscopic motion picture camera comprising means for feeding a strip of film therethrough, lens elements, each adapted to receive an image therethrough from a different point depending upon the separation of said lens elements, and mechanisms for shifting the film within said camera into a position of focus substantially perpendicular to the axis of and axially rearward of either of said lens elements to receive the respective images photographed on said film.

9. A stereoscopic motion picture camera, comprising a casing, a pair of spaced lenses therein, a track mounted in the casing in rear of the lenses, a frame slidable upon the track, a strip of film engaging said frame, and inter-connected mechanisms for advancing the film vertically through the frame and moving the frame alternately in rear of the lenses.

10. A stereoscopic picture camera adapted to receive a film moved therethrough, and a pair of lenses adjustably related to bring the principal objects of the image from each lens substantially at the same position of alignment on the respective portions of the film exposed and means moving said frame into position axially rearward of each lens.

11. In a stereoscopic motion picture camera, a pair of horizontally alined lenses, means for alining a view of the object to be photographed in a desired position on a film, means for adjusting the lenses for registration of complementary stereoscopic views, and means for alternately photographing complementary stereoscopic images on said film.

12. In a stereoscopic motion picture camera, a pair of horizontally alined lenses, means for alternately photographing therethrough complementary stereoscopic images on a single strip of film, and means whereby the registration of said complementary images may be varied.

13. In a stereoscopic motion picture camera, a pair of horizontally alined lenses, means for alternately photographing therethrough complementary stereoscopic images on a single strip of film, and means whereby the registration of said complementary images may be gradually varied.

14. In a stereoscopic motion picture camera, a pair of horizontally alined lenses, means for shifting one of the lenses in a horizontal plane and maintaining the axis thereof parallel to the axis of the other lens, and means for alternately photographing therethrough complementary stereoscopic images on said film.

15. A stereoscopic camera comprising a pair of lenses horizontally aligned, means permitting alternate photographing of the images projected through said lenses in vertical order upon a photographic element, and mechanism oscillating said element linearly within the camera in a plane substantially perpendicular to the axis of each lens.

16. A camera, a shutter therefor, a pair of horizontally aligned lenses, means operating to photograph complementary images of a stereoscopic picture received through said lenses alternately and in vertical order upon a photographic element, said means comprising linearly movable oscillatory mechanism for said element interconnected for timed operation with said shutter.

17. A stereoscopic motion picture camera comprising horizontal aligned lenses, means varying the separation of said lenses one from another, means shifting a photographic element linearly from one to the other of said lenses to receive the respective complementary images of a stereoscopic picture projected through said respective lenses upon the photographic element, and a shutter timed for operation with the shifting means for said element.

18. In a stereoscopic camera, the combination with a pair of horizontally aligned lenses of a film guide frame having an aperture therein, a roller having a strip of film engaged thereon and adapted to be exposed through the aperture, means for alternately shifting the film laterally into position in rear of a lens, a shutter for exposing the film through each lens when in rear thereof, and means for advancing the film vertically past the aperture.

19. In a stereoscopic camera, the combination with a pair of lenses, of a guide rod, a film guide frame slidably engaged thereon and having a strip of film engaged therein, means for shifting said frame back and forth on the guide rod, means for admitting light through a lens to the film when the frame is in rear of each lens and in an extreme shifted position, and means for advancing the strip of film through the frame.

20. In a device of the class described, the combination with a pair of horizontally aligned lenses of a plurality of guiding members, a film guide frame slidably engaging the guiding members and having a strip of film vertically movable therethrough and means acting to move the frame back and forth on the guiding members for alternately exposing the film through a right and left lens.

21. In a device of the class described, the combination with a pair of horizontally aligned lenses, of a plurality of guiding members, a film guide frame slidably engaged therewith, means for reciprocating the frame on the guiding members, and a rotating shutter in synchronism with the frame to alternately admit light through the right and left lens.

22. In a stereoscopic moving picture camera, the combination with a pair of horizontally aligned lenses within the camera, of a laterally slidable frame within the camera, means mounted on the frame for feeding film longitudinally therethrough, and means in synchronism with the slidable frame for alternately admitting light through the lenses.

23. In a moving picture, stereoscopic camera, a pair of lenses, a slidable film frame movable into position rearward of each lens, means reciprocating said film frame, and means feeding a film through said frame during each reciprocation thereof.

24. In a moving picture, stereoscopic camera, a pair of lenses, a film frame slidable into position to receive the focal rays from each lens alternately, means reciprocating said film frame, a shutter for opening said lenses alternately during a rest period of said frame, and means on said frame for advancing a film therethrough during each reciprocation thereof.

25. In a moving picture, stereoscopic camera, a pair of lenses, a film frame slidable into position to receive the focal rays from each lens alternately, means reciprocating said film frame, and a shutter for opening said lenses alternately during a rest period of said frame.

In testimony whereof I have hereunto subscribed my name in the presence of two subscribing witnesses.

ALFRED J. MACY.

Witnesses:
CHARLES WELLS, Jr.,
EARL M. HARDINE.